V. HIMMER.

Pendulum-Clock.

No. 8,194. Reissued April 23, 1878.

Witnesses:

John C. Tunbridge

A. W. Briesen

Inventor:

Vitalis Himmer by his attorney

A. W. Briesen

N. PETERS, PHOTO-LITHOGRAPHER, WASHINGTON, D. C.

UNITED STATES PATENT OFFICE.

VITALIS HIMMER, OF NEW YORK, N. Y.

IMPROVEMENT IN PENDULUM-CLOCKS.

Specification forming part of Letters Patent No. 163,868, dated June 1, 1875; Reissue No. 8,194, dated April 23, 1878; application filed March 19, 1878.

*To all whom it may concern:*

Figure 2:
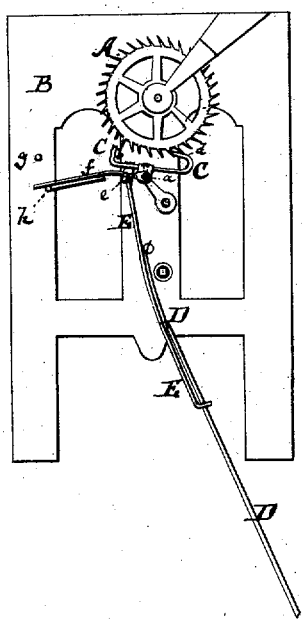
Figure 1:
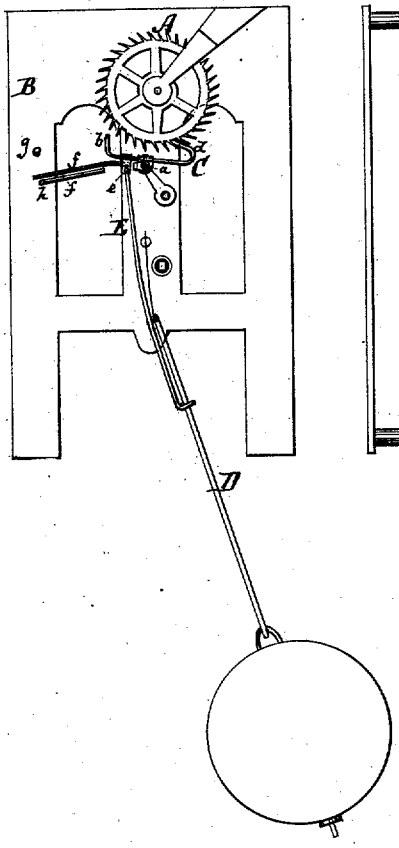
Figure 3:
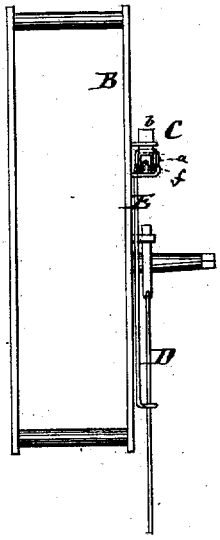

Be it known that I, VITALIS HIMMER, of New York, in the county of New York and State of New York, have invented a new and Improved Pendulum-Clock, of which the following is a specification:

Figures 1 and 2 are face views of my improved pendulum-clock, showing it in different positions. Fig. 3 is an edge view of the same.

Similar letters of reference indicate corresponding parts in all the figures.

This invention has for its object so to construct a pendulum-clock that the same will be in proper running condition even if not suspended or supported in the exact vertical position for which it may have been constructed.

The invention consists in connecting the anchor, which turns on a fixed pin by a flexible joint, to the crutch-wire, so that by the jointed connection the crutch-wire will be enabled to turn or swing independent of the anchor, which is necessary in order to prevent the pallets from entering too deeply into the escapement-wheel when the clock hangs inclined.

The invention also consists in providing the anchor with a projecting arm, that moves between two stop-pins on the frame of the clock, to define the motion of the anchor and prevent the pallets from entering too deeply between the teeth of the escapement-wheel.

In the accompanying drawing, the letter A represents the escapement-wheel of a clock, and B the frame of such clock. C is the anchor, hung to a fixed pin, *a*, that projects from the frame B, and provided with pallets *b* and *d*, which engage between the teeth of the escapement-wheel, in the customary manner. D is the pendulum-rod, and E the crutch-wire, which connects the anchor with the pendulum-rod. The pendulum-rod is hung to the clock-frame in the customary or in suitable manner, and is embraced by, or connected with, the lower portion of the crutch-wire, also in the customary or suitable manner. The upper end of the crutch-wire is swiveled in the anchor, so that it can turn therein; or, if not swiveled in the anchor direct, or in a projection, *e*, thereof, as shown, the crutch-wire is made jointed for similar effect. *f* is a projecting wire or arm, rigidly attached to the anchor; and *g* is a pin projecting from the frame B above the wire *f*, while *h* is a pin projecting from the frame B below the wire *f*. These two pins *g* and *h*, by limiting the vibration of the arm *f*, limit also the movement of the anchor. Now, if the clock should hang or stand in proper vertical position, which is indicated in Fig. 1, and the pendulum should be vibrated properly, the motion of the pendulum would, by means of the crutch-wire, be transmitted to the anchor, and the anchor thereby caused to regulate the rotary motion of the escapement-wheel A in the requisite manner. The pins *g* and *h*, meanwhile—that is, as long as the clock hangs straight—will hardly be necessary; but when the clock is hung inclined, as indicated in Fig. 2, the pendulum will have a tendency to carry one pallet of the anchor deeper into the escapement-wheel than the other, which, of course, would defeat the entire object of the clock, and cause it to stop running, and to prevent which the stop-pins *g* and *h* are provided. If the clock is inclined to the right, as indicated in Fig. 2, the lower pin, *h*, will be struck by the projecting arm *f* of the anchor before the pendulum has completed its motion to the right, and consequently that part of the motion in the pendulum which takes place after the pin *f* has struck the stop *h* will cause a similar motion of the crutch-wire E, independent of the anchor C. Such independent motion of the crutch-wire is permitted by having its upper end swiveled in the anchor, or by otherwise jointing the crutch-wire; and were it not for such joint in the crutch-wire, or in its jointed connection with an anchor that is hung on a fixed pin, the crutch-wire would necessarily carry the right pallet *d* too far into the escapement-wheel; or else, when the stop *h* is provided, the pendulum would be arrested in its motion to the right before its normal vibration had been completed. When the clock is inclined too much to the other side, the pin *g* arrests the upward motion of the left-hand pallet *b*, and determines the position of the anchor, from which the crutch-wire is to begin its independent motion.

As to the form of joint between the crutch-wire and the anchor, I prefer to screw it into a projection, *e*, of the anchor, as shown in the drawing, for the reason that the screw-thread on the end of the crutch-wire, though allowing of the independent vibration of the latter, will still cause more friction than the fixed pivot *a* of the anchor, which is necessary in order to cause the crutch-wire to carry the anchor through the normal operation of the clock; but any other suitable form of joint between the crutch-wire and the said anchor, or in the crutch-wire itself, may be used.

I claim as my invention—

1. In a pendulum-clock, the crutch-wire E, connected by a flexible joint with the anchor C or a projection thereof, said anchor being hung on a fixed pin, *a*, substantially as described.

2. In combination with the anchor C and jointed crutch-wire E, the projecting pin *f* and the stop-pins *g* and *h*, arranged substantially as and for the purpose described.

VITALIS HIMMER.

Witnesses:

A. V. BRIESEN,

T. B. MOSHER.